United States Patent

Epple et al.

[11] Patent Number: 5,269,464
[45] Date of Patent: Dec. 14, 1993

[54] SPRAYING DEVICE FOR MOTOR VEHICLE HEADLAMP-CLEANING SYSTEMS

[75] Inventors: Anton Epple, Rottenburg; Wolfram Frey, Althengstett; Hans Trube, Herrenberg; Martin Pfeiffer, Stuttgart; Reiner Jocher; Harald Gerstner, both of Aidlingen, all of Fed. Rep. of Germany

[73] Assignee: Mercedes-Benz AG, Fed. Rep. of Germany

[21] Appl. No.: 15,407

[22] Filed: Feb. 8, 1993

[30] Foreign Application Priority Data

Feb. 6, 1992 [DE] Fed. Rep. of Germany ....... 4203380

[51] Int. Cl.⁵ .................. B05B 15/10; B05B 1/10
[52] U.S. Cl. .................... 239/130; 239/135; 239/197; 239/284.2; 239/588
[58] Field of Search ............ 239/130, 135, 139, 195, 239/197, 284.1, 284.2, 587.1, 587.2, 587.5, 587.6, 588; 134/172

[56] References Cited

U.S. PATENT DOCUMENTS

| | | | |
|---|---|---|---|
| 865,355 | 4/1907 | Callmann et al. | 239/588 |
| 3,117,727 | 1/1964 | Pollock et al. | 239/284.2 |
| 3,632,042 | 1/1972 | Goulish et al. | 239/139 X |
| 3,656,691 | 4/1972 | Norstrand | 239/284.2 |
| 4,230,276 | 10/1980 | Tinder et al. | 239/284.2 X |
| 4,815,769 | 3/1989 | Hopperdietzel | 239/135 X |
| 4,826,087 | 5/1989 | Chinery | 239/588 X |
| 5,194,217 | 3/1993 | St. Louis et al. | 239/588 X |

FOREIGN PATENT DOCUMENTS

| | | | |
|---|---|---|---|
| 0262402 | 4/1988 | European Pat. Off. | |
| 2455294 | 5/1976 | Fed. Rep. of Germany . | |
| 3518685 | 6/1986 | Fed. Rep. of Germany . | |
| 4121316 | 1/1992 | Fed. Rep. of Germany | 239/284.2 |
| 320282 | 2/1970 | Sweden | 239/284.2 |
| 2026851 | 2/1980 | United Kingdom | 239/284.2 |

*Primary Examiner*—Andres Kashnikow
*Assistant Examiner*—William Grant
*Attorney, Agent, or Firm*—Evenson, McKeown, Edwards & Lenahan

[57] ABSTRACT

A spraying device for headlamp-cleaning systems for motor vehicles having an essentially cylindrical nozzle carrier which comprises two sections, with the vehicle-external nozzle carrier section being formed from a number of annular segments connected to one another in a hinge-like manner. In a rest position, the nozzle carrier is retracted in the vehicle body. When moved into the operating setting outside the vehicle, the front nozzle carrier section comprising the annular segments curves in an arc shape, such that a cleaning nozzle fitted to the head end of the nozzle carrier comes to be situated in an area just in front of the headlamp diffusing screen.

20 Claims, 3 Drawing Sheets

SPRAYING DEVICE FOR MOTOR VEHICLE HEADLAMP-CLEANING SYSTEMS

BACKGROUND AND SUMMARY OF THE INVENTION

The present invention relates to a spraying device for headlamp-cleaning systems for motor vehicles, and, more particularly, to a device comprising a nozzle carrier, an actuating device for moving the nozzle carrier in a telescopic manner out of a retracted rest position in a cylindrical receiving and guide tube retracted in a vehicle body into an operating setting in an area in front of a diffusing screen of a vehicle headlamp, a flexible line operatively connecting the nozzle carrier to a washwater reservoir, a head end of the nozzle carrier is configured, in a direction of the vehicle exterior, as a cover plate which, in the retracted rest position, produces a rectilinear continuation of a vehicle contour and comprises a nozzle holder attached to the head end of the nozzle carrier and at least one cleaning nozzle which is directed, in the operating setting, towards the diffusing screen.

A variety of fixed-mounted, but also extensible, headlamp-cleaning nozzles are known. The fixed-mounted cleaning nozzles are generally located on bumpers at a relatively great distance from the diffusing screen, thereby enabling a satisfactory cleaning effect to be obtained only with a high water consumption. Moreover, as a result of this exposed position, the nozzles are subject to a considerable risk of damage. Soiling and, in winter, freezing-up of the nozzles prevent them from functioning as intended.

From German Offenlegungsschrift 24 55 294 discloses a headlamp-cleaning system for vehicles exhibiting a spraying device which can be moved from the vehicle body out of a retracted rest position into an operating setting. The spraying device comprises a flexible hose which, in the rest position, is rolled up in a spiral shape and is housed in a recess in the front bumper and which can be stretched by a pressure device so that, in the operating setting, the cleaning nozzle fitted to the end of the hose is pointing at the diffusing screen.

A variant of the foregoing system provides for the spraying device a dimensionally stable tube, which, in the rest position, is fully retracted in the vehicle body and is moved into the operating position by an actuating device. These two cleaning systems are very space-consuming and, moreover, are very delicate and unstable, e.g. when the system is actuated in a strong slipstream.

German Patent Specification 35 18 685 describes a headlamp-cleaning system in which the spraying device is housed in the vehicle body in the area of the headlamp. The nozzle carrier with the nozzle, under the influence of pressure, is able to be extended in telescopic manner horizontally out of the vehicle body, so that the cleaning nozzle comes to be situated at some distance in front of and beneath the diffusing screen. This spraying device is of very compact configuration, so that it can be integrated into the headlamp housing. The operating setting of the cleaning nozzle is located, however, at a distance from the luminous disc comparable to that of the nozzles fixed-mounted on the bumper, from which the cleaning effectiveness suffers.

An object of the invention is to provide a compact spraying device, which can also be integrated into the headlamp housing, having improved functionality. The spraying device of the present invention is to exhibit a good cleaning effect, comparable to the prior art, combined with lower water consumption. In addition, another object is to improve the optical impression.

These objects have been achieved by a spraying device in which the section of the nozzle carrier which, in the operating setting, protrudes out of the vehicle body curves, in the operating setting, in the shape of an arc, such that the nozzle holder comes to be situated having at least one cleaning nozzle in an area just in front of the diffusing screen. This enables the cleaning nozzle to be moved easily out of the rest position below the headlamp into the operating setting directly in front of the diffusing screen, so that, in the cleaning procedure, the spray path is shortened, resulting in a clear decrease in water consumption combined with an equal or better cleaning effect.

One particular embodiment provides for the nozzle carrier to comprise two interconnected sections. In this configuration, the rear nozzle carrier section is an essentially cylindrical tube, while the front nozzle carrier section comprises a number of annular segments, which are connected on their underside by hinges running transversely to the longitudinal direction of the nozzle carrier. The width of the individual segments decreases in the direction of the top side of the nozzle carrier, so that a gap, which widens in the direction of the top side of the nozzle carrier, is created in each case between the segments. The construction of these gaps determines the radius of curvature in the operating setting.

An advantageous construction provides for the segments of the nozzle carrier to exhibit a toothed profile on their top side. As a result, the arrangement has a clearly increased stability in the operating setting, thereby guaranteeing problem-free usage even in a strong slipstream.

Advantageously, the two sections of the nozzle carrier are produced from the same material, in particular from a dimensionally stable and fracture-resistant plastic. In order to obtain an aesthetically pleasing appearance, the front section of the nozzle carrier which, in the operating setting, protrudes out of the vehicle body can be kept in the color of the car.

In a further embodiment, the nozzle carrier exhibits a control cable, the first end of which is anchored in the first segment adjoining the nozzle holder and which interconnects all subsequent segments. Its second end is connected to a spring force device.

In a configuration of the invention, the spring force device comprises a slide which is fitted displaceably on the rear nozzle carrier section and in an oblong recess in the receiving and guide tube and in which the second end of the control cable is anchored. To a suitably configured projection of the slide there is fitted an elastic element, in particular a helical spring, the second end of which is firmly connected to a projection of the receiving and guide tube.

In another configuration of the invention, the nozzle holder can be configured in one piece with the first segment.

A further construction provides for the actuating device for the movement of the nozzle carrier to comprise a drive motor driving at least one gearwheel fitted in a recess in the receiving and guide tube. This gearwheel engages in a lower part, configured like a rack, of the rear nozzle carrier section. By the rotation of the gearwheel, the nozzle carrier is moved out of the rest position into the operating setting and back again.

In a further design, the flexible line is a water hose which leads through the hollow interior of the nozzle carrier to the nozzle holder, to which it is firmly connected. The water hose exhibits, advantageously, an electric heating. The nozzle fitted in the nozzle holder can also be electrically heated.

In order, in the rest position, to prevent dirt and moisture from penetrating into the receiving and guide tube, the nozzle holder can be provided in the direction of the vehicle exterior with a sealing rubber gasket.

In another embodiment of the invention, the outside mouth of the receiving and guide tube is of funnel-shaped configuration. This ensures that the segments can be returned more easily into the receiving and guide tube.

In order to reduce the penetration of dirt and moisture in the operating setting also, in a further configuration the receiving and guide tube can be fitted in the vehicle body such that, sloping gently down in the direction of the vehicle exterior, it forms an acute angle, a, to the vehicle's standing plane.

BRIEF DESCRIPTION OF THE DRAWINGS

These and further objects, features and advantages of the present invention will become more readily apparent from the following detailed description when taken in conjunction with the accompanying drawings wherein.

DETAILED DESCRIPTION OF THE DRAWINGS

Figure 1:
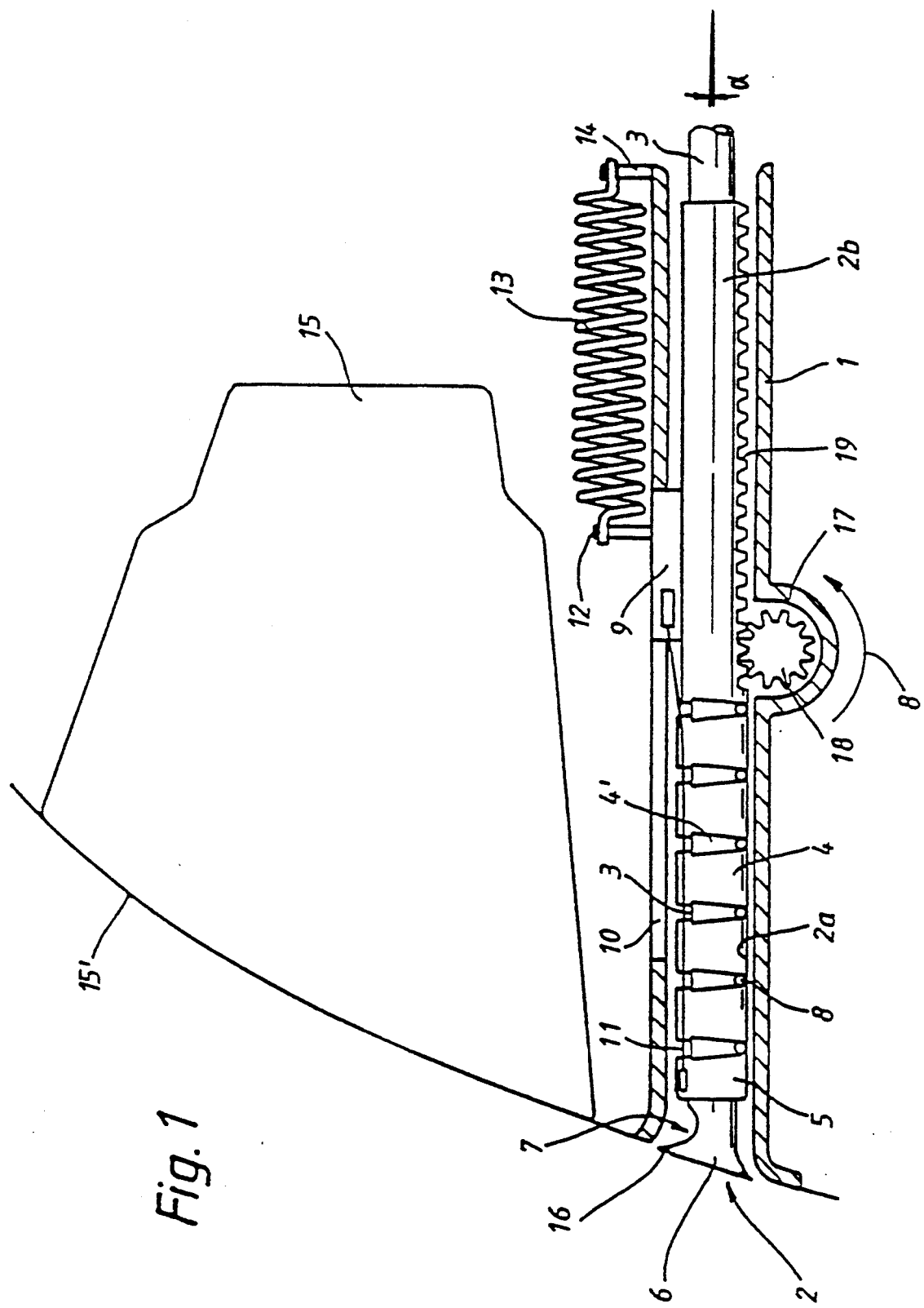
FIG. 1 is a partial cross-sectional schematic view of a spraying device according to the invention in a rest position.

FIG. 1 shows a spraying device according to the invention for headlamp-cleaning systems. The spraying device is fitted directly beneath a schematically illustrated headlamp housing 15 having a diffusing screen 15' and comprises an essentially cylindrical, horizontal receiving and guide tube 1, which, on its top side pointing towards the headlamp, has an oblong recess 10. For reasons of better clarity, the receiving and guide tube 1 is shown in cross section in the longitudinal direction, in order to illustrate the further elements of the spraying device located in the inside of the tube 1.

Inside of the receiving and guide tube 1, there is mounted an essentially cylindrical nozzle carrier designated generally by numeral 2, comprising two interconnected sections 2a, 2b. The vehicle-internal, rear nozzle carrier section 2b comprises a cylindrical tube, the lower part of which has a racked profile 19. The vehicle-external, front nozzle carrier section 2a comprises a number of annular segments 4, 5, which are connected on their underside by hinges 8 running transversely to the longitudinal direction of the nozzle carrier 2. The annular segments 4, 5 exhibit a lesser width on the top side of the nozzle carrier, so that gaps 4' of an upside-down or inverted triangular shape are created between the individual segments 4, with the apex of the triangle being formed by the hinges 8. To the segment 5 coming closest to the vehicle exterior, the head end of the nozzle carrier in the form of a nozzle holder 6 is joined, which nozzle holder 6 is configured in the direction of the vehicle exterior as a cover plate, so that, in the retracted rest position, a rectilinear continuation of the vehicle contour is produced. In order to protect, in the rest position, the interior of the receiving and guide tube 1 from penetration of moisture and dirt, the nozzle holder 6 is provided with a sealing rubber gasket 16 to seal off the opening in the receiving and guide tube 1 in the rest position. In the nozzle holder 6, there is located at least one cleaning nozzle 7. Advantageously, the nozzle holder 6 is configured in one piece with the adjoining first segment 5.

Connection to a conventional washwater-reservoir (not shown) is created by a flexible water hose 3, which reaches through the cavity in the rear nozzle carrier section 2b and through the annular segments 4, 5 to the nozzle holder 6 to which it is firmly connected. The spraying device also has a control cable 11, the first end of which is anchored in the upper section of the first segment 5. The control cable 11 interconnects the subsequent segments 4 in that it is guided by bores made on the top sides of the segments parallel to the longitudinal direction of the nozzle carrier. The second end of the cable is anchored in a slide 9, which is mounted displaceably on the rear nozzle carrier section 2b and in the recess 10 in the receiving and guide tube 1. The slide 9 has a projection 12 to which there is fastened a spring 13 whose other end is firmly connected to a projection 14 of the receiving and guide tube 1.

Figure 2:
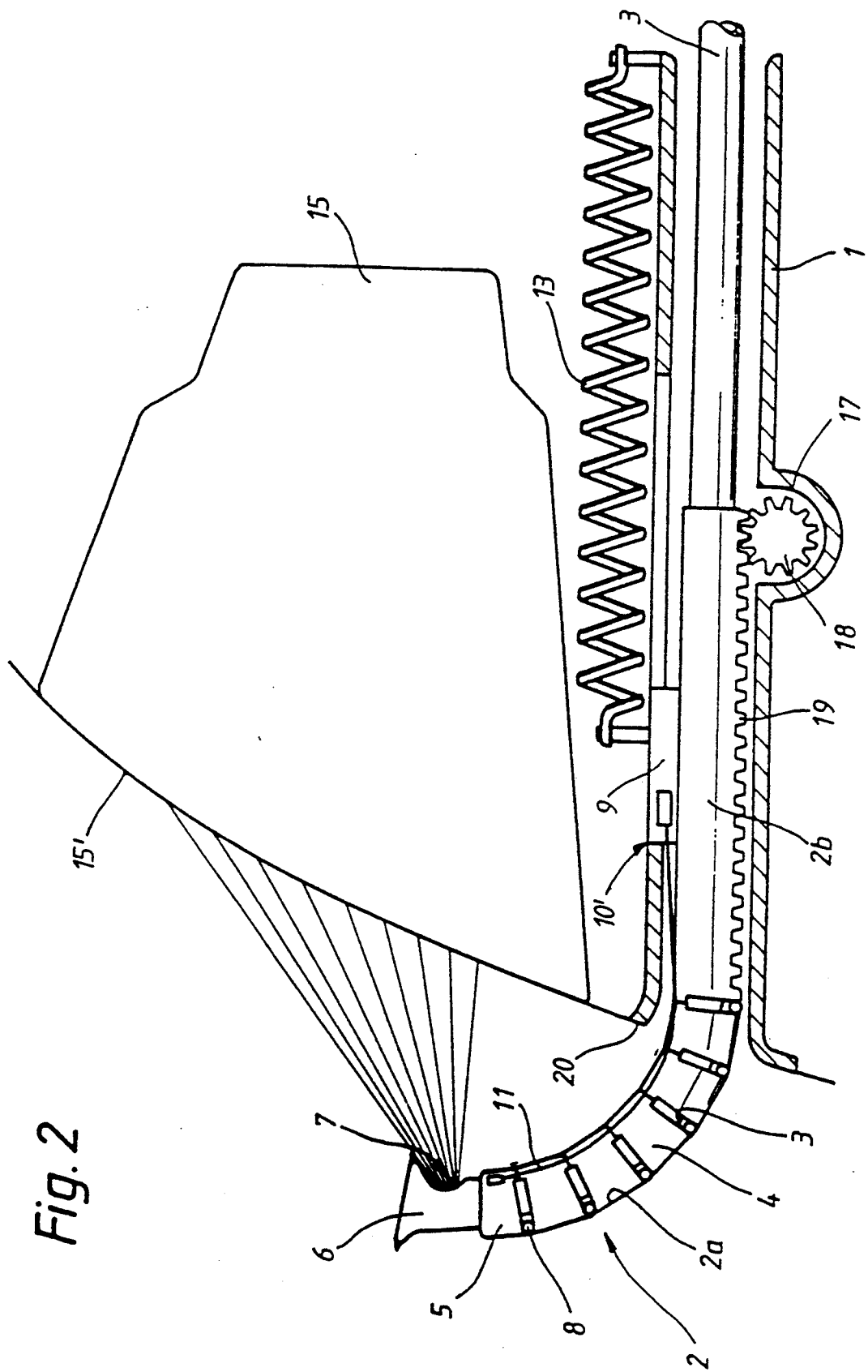
FIG. 2 is an enlarged partial view of the spraying device of FIG. 1 in an operating setting.

In a recess 17 beneath the nozzle carrier 2 in the receiving and guide tube 1, a gearwheel 18 is arranged to be driven by a drive motor (not shown) and engages in the racked profile 19 of the rear nozzle carrier section 2b. By rotation of the gearwheel 18 in the counterclockwise direction of rotation indicated by the arrow P, the nozzle carrier 2 is moved out of the rest position into the operating setting illustrated in FIG. 2. With this movement of the nozzle carrier, the slide 9 connected via the control cable 11 to the first segment 5 is jointly moved but simultaneously undergoes, by virtue of the spring 13, a tensile force in the opposite direction. The spring force is transmitted by the control cable 11 to the first segment 5, which thereby rotates about the hinge 8 until butting against the subsequent segment. This subsequent segment now rotates in turn about the following hinge until it butts against the third segment. This continues until all segments are rotated about the respective hinges to the point where they butt against the subsequent segment and so the front nozzle carrier section 2a describes an upwardly pointing arc. The flexible water hose 3 housed inside the nozzle carrier 2 curves together with the front nozzle carrier section 2a. The length of the control cable 11 and the spring force of the spring 13 are matched such that the operating setting is reached whenever the slide 9 comes to butt against the stop surface 10' on the receiving and guide tube 1.

As a result of the upwardly pointing curvature of the front nozzle carrier section 2a, the cleaning nozzle 7 housed in the nozzle holder 6 is brought into a position in the area of the center of the diffusing screen 15', just in front of the diffusing screen 15'. The washwater conveyed through the water hose 3 is transported onward in the inside of the nozzle holder 6, in a conventional manner through a channel (not shown), to the cleaning nozzle 7, which sprays the washwater at a suitable angle onto the diffusing screen 15'. The funnel-shaped configuration of the mouth 20 of the receiving and guide tube 1 facilitates the return of the annular segments 4, 5 into their rectilinear rest position in the receiving and guide tube shown in FIG. 1.

Figure 3:
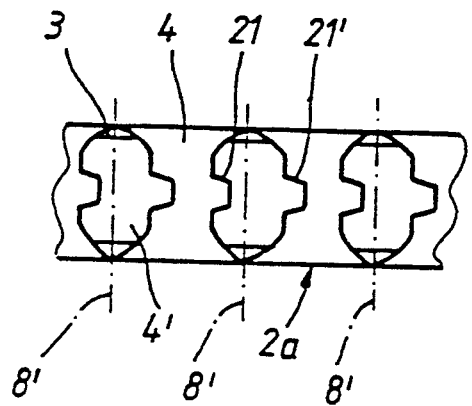
FIG. 3 is a plan view of the segments of the nozzle carrier with their toothed profile.

FIG. 3 shows a part of the front nozzle carrier section 2a in the rest position according to FIG. 1 and in top view. As a result of the decreasing width of the annular segments 4, the gaps 4' are created between the individual segments. The gaps 4' taper downwardly, i.e. towards the side facing away from the observer, to the hinges 8, whose axes 8' are indicated in FIG. 3 by dot-dash lines. The size of these gaps 4' determines the radius of curvature of the operating setting. In order to increase stability, the segments 4 have on their top side, i.e. in the area of the greatest width of the triangular gap, a type of toothed profile 21, 21'. In the operating setting, the cams 21 of a segment engage in the recesses 21' in the adjacent segment, thereby increasing the lateral torsion-resistance of the arrangement in the operating setting according to FIG. 2.

Figure 4:
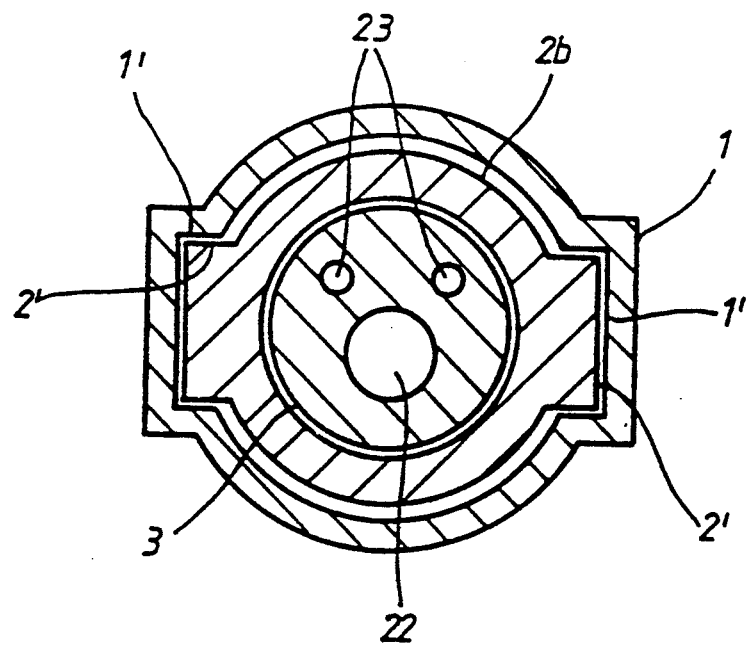
FIG. 4 is a cross-sectional view through the rear nozzle carrier section.

FIG. 4 shows a cross-section through the guide tube 1 in the area of the rear nozzle carrier section 2b. Inside of the receiving and guide tube 1, there is mounted the essentially cylindrical, rear nozzle carrier section 2b, which receives, in turn, the flexible water hose 3. The water hose 3 has a channel 22 of relatively larger diameter, which serves to transport the washwater, and two channels of relatively smaller diameter, which serve as heating flues 23. In order to increase the guide stability, the cylindrical tube of the rear nozzle carrier section 2b has rectangular ribs 2' running in the longitudinal direction to engage in correspondingly formed-out grooves 1' in the receiving and guide tube 1, thereby guaranteeing the guidance of the nozzle carrier (2) in the receiving and guide tube.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A spraying device for headlamp-cleaning systems for a motor vehicle, comprising a nozzle carrier, an actuating device for moving the nozzle carrier in a telescopic manner out of a retracted rest position in a cylindrical receiving and guide tube retracted in a vehicle body into an operating setting in an area in front of a diffusing screen of a vehicle headlamp, a flexible line operatively connecting the nozzle carrier to a washwater reservoir, a head end of the nozzle carrier being configured, in a direction of the vehicle exterior, as a cover plate which, in the retracted rest position, produces a rectilinear continuation of a vehicle contour and comprises nozzle holder attached to the head end of the nozzle carrier and at least one cleaning nozzle which is directed, in the operating setting, towards the diffusing screen, and means for causing a section of the nozzle carrier which, in the operating setting, protrudes out of the vehicle body to become an arc shape such that the nozzle holder is situated having the at least one cleaning nozzle adjacent a front of the diffusing screen.

2. The spraying device according to claim 1, wherein the nozzle carrier comprises a rear nozzle carrier section configured as an essentially cylindrical tube and a front nozzle carrier section having annular segments whose width decreases in a direction of a top side of the nozzle carrier and which are connected on a wider side thereof by hinges running transversely to the longitudinal direction of the nozzle carrier.

3. The spraying device according to claim 2, wherein a side of the annular segments facing away from the hinges has a toothed profile.

4. The spraying device according to claim 2, wherein the front and rear sections of the nozzle carrier consist of a dimensionally stable and fracture-resistant plastic material.

5. The spraying device according to claim 4, wherein a side of the annular segments facing away from the hinges has a toothed profile.

6. The spraying device according to claim 2, wherein, in a first of the segments adjoining the nozzle holder, a first end of a control cable is anchored and interconnects all remaining segments with a second end of the control cable being subjected to tensile force.

7. The spraying device according to claim 6, wherein a slide is displaceably arranged on the rear nozzle carrier section and in an oblong recess in the receiving and guide tube, the second end of the control cable being anchored to the slide, and an end of the slide facing away from the control cable is arranged to be acted upon by one end of a spring-elastic element, and another end of the spring-elastic element is firmly connected to a projection of the receiving and guide tube.

8. The spraying device according to claim 6, wherein the nozzle holder and the first segment are a unitary piece.

9. The spraying device according to claim 8, wherein a slide is displaceably arranged on the rear nozzle carrier section and in an oblong recess in the receiving and guide tube, the second end of the control cable being anchored to the slide, and an end of the slide facing away from the control cable is arranged to be acted upon by one end of a spring-elastic element, and another end of the spring-elastic element is firmly connected to a projection of the receiving and guide tube.

10. The spraying device according to claim 1, wherein the actuating device for the movement of the nozzle carrier comprises at least one motor driven gearwheel fitted in a recess in the receiving and guide tube, to engage in a racked profile portion of the nozzle carrier.

11. The spraying device according to claim 1, wherein the flexible line is a water hose arranged inside the nozzle carrier to communicate with the nozzle holder.

12. The spraying device according to claim 11, wherein the water hose includes means for heating washwater flowing therethrough.

13. The spraying device according to claim 1, wherein the at least one cleaning nozzle is arranged to be heatable.

14. The spraying device according to claim 1, wherein the nozzle holder is provided in the direction of the vehicle exterior with a sealing rubber gasket.

15. The spraying device according to claim 1, wherein an outside mouth of the receiving and guide tube is of funnel-shaped configuration.

16. The spraying device according to claim 1, wherein the receiving and guide tube is configured to slope gently down in the direction of the vehicle exterior, to form an acute angle with a standing plane of the vehicle.

17. The spraying device according to claim 16, wherein an outside mouth of the receiving and guide tube is of funnel-shaped configuration.

18. The spraying device according to claim 17, wherein the nozzle holder is provided in the direction of the vehicle exterior with a sealing rubber gasket.

19. The spraying device according to claim 18, wherein the at least one cleaning nozzle is arranged to be heatable.

20. The spraying device according to claim 19, wherein the flexible line includes means for heating washwater flowing therethrough.

* * * * *